United States Patent
Wu

(10) Patent No.: US 11,636,826 B1
(45) Date of Patent: Apr. 25, 2023

(54) ELECTRONIC DEVICE WITH CONNECTOR SUPPORTING MULTIPLE CONNECTION STANDARDS AND UPDATE METHOD THEREOF

(71) Applicant: GETAC TECHNOLOGY CORPORATION, New Taipei (TW)

(72) Inventor: Ming-Zong Wu, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 17/525,765

(22) Filed: Nov. 12, 2021

(51) Int. Cl.
  *G09G 5/00* (2006.01)
  *G06F 3/06* (2006.01)
  *G06F 3/14* (2006.01)

(52) U.S. Cl.
  CPC ........... *G09G 5/006* (2013.01); *G06F 3/0679* (2013.01); *G06F 3/14* (2013.01); *G09G 2370/047* (2013.01); *G09G 2370/12* (2013.01)

(58) Field of Classification Search
  CPC ..... G06F 1/1632; G06F 13/4081; G06F 15/00
  See application file for complete search history.

(56) References Cited

U.S. PATENT DOCUMENTS

| | | | |
|---|---|---|---|
| 11,216,402 B2* | 1/2022 | Takizawa | G06F 3/0683 |
| 2008/0307199 A1* | 12/2008 | Tseng | G09G 5/003 |
| | | | 712/E9.001 |
| 2009/0027409 A1* | 1/2009 | Kao | G09G 5/006 |
| | | | 345/543 |
| 2017/0060804 A1* | 3/2017 | Chiba | G06F 13/4022 |
| 2019/0394523 A1* | 12/2019 | Makino | H04N 21/43635 |
| 2021/0065651 A1* | 3/2021 | Chen | G09G 5/005 |

* cited by examiner

*Primary Examiner* — Getente A Yimer

(57) ABSTRACT

An electronic device with a connector supporting multiple connection standards includes the connector, a processor, a controller, an EDID (Extended Display Identification Data) ROM, a first multiplexer circuit and a second multiplexer circuit. The first multiplexer circuit is coupled to at least one signal pin of the connector, the processor and the controller. The second multiplexer circuit is coupled to the EDID ROM, the first multiplexer circuit, the processor and the controller. Under an update state, the controller is electrically connected to the EDID ROM through the second multiplexer circuit, and updates EDID in the EDID ROM with update data.

30 Claims, 9 Drawing Sheets

ELECTRONIC DEVICE WITH CONNECTOR SUPPORTING MULTIPLE CONNECTION STANDARDS AND UPDATE METHOD THEREOF

BACKGROUND OF THE INVENTION

Field of the Invention

The present application relates to an electronic device with a connector supporting multiple connection standards, and more particularly, to an electronic device with a connector supporting multiple connection standards and an update method thereof.

Description of the Prior Art

Conventionally, a standard display device includes an Extended Display Identification Data (EDID) read-only memory (ROM), and the EDID ROM stores EDID therein. Once an image source device is connected to a standard display device, the image source device reads the EDID in the standard display device, so as to obtain display data of the standard display device and to accordingly provide a matching image to the standard display device.

However, the special display device does not include an EDID ROM, and such EDID ROM is provided in the image source device instead. At this point in time, in order to update EDID used for the special display device, such update needs to be performed using the image source device.

Moreover, conventionally, corresponding connectors need to be individually provided for multiple connection standards in order for the image source device to support these multiple connection standards. However, as the number of connectors necessarily provided gets larger, both the volume and the cost of the image source device are increased.

In addition, although the image source device may be equipped with a DisplayPort connector with customized pins to connect to a special device, such DisplayPort connector occupies a large area in an input/output panel, and the standard High-Definition Multimedia Interface Display Data Channel (HDMI DDC) bus is given up due to pin limitations of a DisplayPort connector, such that the electronic device cannot be connected to a standard display device using a standard DisplayPort connector or a standard HDMI connector. As a result, applications of a system terminal user are made inflexible.

SUMMARY OF THE INVENTION

In one embodiment, the present invention provides an electronic device with a connector supporting multiple connection standards. An electronic device with a connector supporting multiple connection standards includes the connector, a processor, a controller, an EDID ROM, a first multiplexer circuit and a second multiplexer circuit. The connector includes at least one signal pin. The controller is coupled to the processor. The EDID ROM is for storing EDID. The first multiplexer circuit is coupled to the at least one signal pin, the processor and the controller. The second multiplexer circuit is coupled to the EDID ROM, the first multiplexer circuit, the processor and the controller. In an update state, the controller is electrically connected to the EDID ROM through the second multiplexer circuit, and updates the EDID ROM with respect to EDID therein using update data.

In one embodiment, the present invention provides an update method for an electronic device with a connector supporting multiple connection standards. The update method includes: in an update state, updating an EDID ROM using update data by the controller through the second multiplexer circuit.

In conclusion, in the electronic device with a connector supporting multiple connection standards and the update method thereof according to the embodiments of the present invention, the connection path is established between the controller and the EDID ROM by switching the multiplexer circuits, so that the controller in an update state is enabled to update using the update data the EDID ROM built-in the electronic device with the connector supporting multiple connection standards. Moreover, in the electronic device with a connector supporting multiple connection standards and the update method thereof according to the embodiments of the present invention, in addition to manually enable the processor to send the update data to the controller for prompting the controller to enter an update state, it can be further automatically determined according to the EDID whether the controller enters the update state after the controller receives a device signal. In particular, after the controller enters the update state in response to the determination result, the controller can further obtain corresponding update data according to the device signal and accordingly perform automatic update. In addition, in the electronic device with a connector supporting multiple connection standards and the update method thereof according to the embodiments of the present invention, the transmission path of the at least one signal pin of the connector is switched according to whether the device signal is received, so that one single connector is enabled to support multiple connection standards, further enabling the electronic device to perform transmission with a standard device or a special device through the single connector, and to select one of the multiple connection standards for application.

The features and advantages of the present invention described in detail in the embodiments below are sufficient for a person skilled in the art to understand and accordingly implement the technical contents of the present invention. Moreover, a person skilled in the art would be able to easily understand the objects and advantages of the present invention on the basis of the disclosure, claims and drawings of the present application.

DETAILED DESCRIPTION OF THE EMBODIMENTS

To better understand the above and other objects, features and advantages of the embodiments of the present invention, detailed description is provided with the accompanying drawings below.

Figure 1:
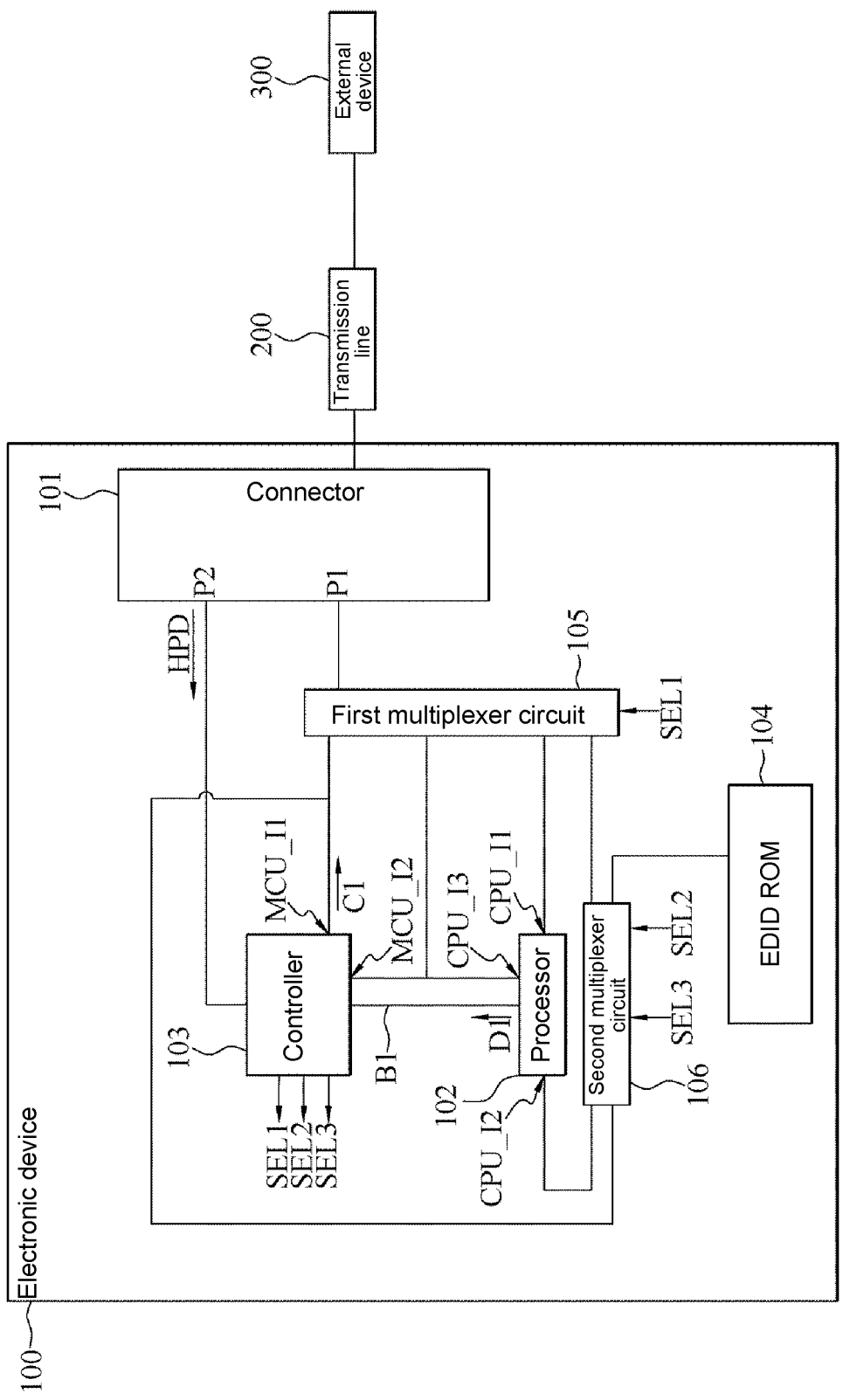
FIG. 1 is a block schematic diagram of an external device connected to an electronic device according to an embodiment.

FIG. 1 shows a block schematic diagram of an external device connected to an electronic device according to an embodiment. Referring to FIG. 1, an electronic device 100 with a connector supporting multiple connection standards includes a connector 101, a processor 102, a controller 103, an Extended Display Identification Data (EDID) read-only memory (ROM) 104, and at least two multiplexer circuits (hereinafter referred to as a first multiplexer circuit 105 and a second multiplexer circuit 106, respectively). The controller 103 is coupled to the processor 102. The first multiplexer circuit 105 is coupled to the connector 101, the processor 102 and the controller 103. The second multiplexer circuit 106 is coupled to the EDID ROM 104, the first multiplexer circuit 105, the processor 102 and the controller 103.

The connector 101 is disposed at a housing of the electronic device 100, and is applicable to being connected to an external device having a corresponding connector so that the electronic device 100 is enabled to perform transmission with the external device. In some embodiments, the external device may be another electronic device having a corresponding connector, so as to be connected to or separated from the connector 101 of the electronic device 100 by means of plugging; however, the present invention is not limited to the above. In some other embodiments, the external device may be an external device 300. The external device 300 is connected to one end of a transmission line 200, and is connected to or separated from the electronic device 100 by plugging the other end of the transmission line 200 with the connector 101. In the description below, the external device is exemplified by the external device 300 that is connected to or separated from the electronic device 100 through the transmission line 200 for illustrations. It should be noted that this example is not to be construed as a limitation to the present invention.

The connector 101 includes at least one signal pin P1. The processor 102 may include a first interface CPU_I1 and a second interface CPU_I2 adopting different connection standards. Moreover, the controller 103 includes a first interface MCU_I1 and a second interface MCU_I2 adopting different connection standards.

Herein, the first multiplexer circuit 105 is coupled to the signal pin P1 of the connector 101, the first interface CPU_I1 of the processor 102, the first interface MCU_I1 of the controller 103, the second interface MCU_I2 of the controller 103 and the second multiplexer circuit 106, and the first multiplexer circuit 105 may selectively electrically connect the signal pin P1 to the first interface CPU_I1 of the processor 102, the first interface MCU_I1 of the controller 103, the second interface MCU_I2 of the controller 103 or the second multiplexer 106 according to a selection signal SEL1 from the controller 103. Moreover, the second multiplexer circuit 106 is coupled to the second interface CPU_I2 of the processor 102, the first interface MCU_I1 of the controller 103, the EDID ROM 104 and the first multiplexer circuit 105, and the second multiplexer circuit 106 can selectively electrically connect the second interface CPU_I2 of the processor 102 to the EDID ROM 104 or the first multiplexer circuit 105, or selectively electrically connect the first interface MCU_I1 of the controller 103 to the EDID ROM 104.

Figure 2:
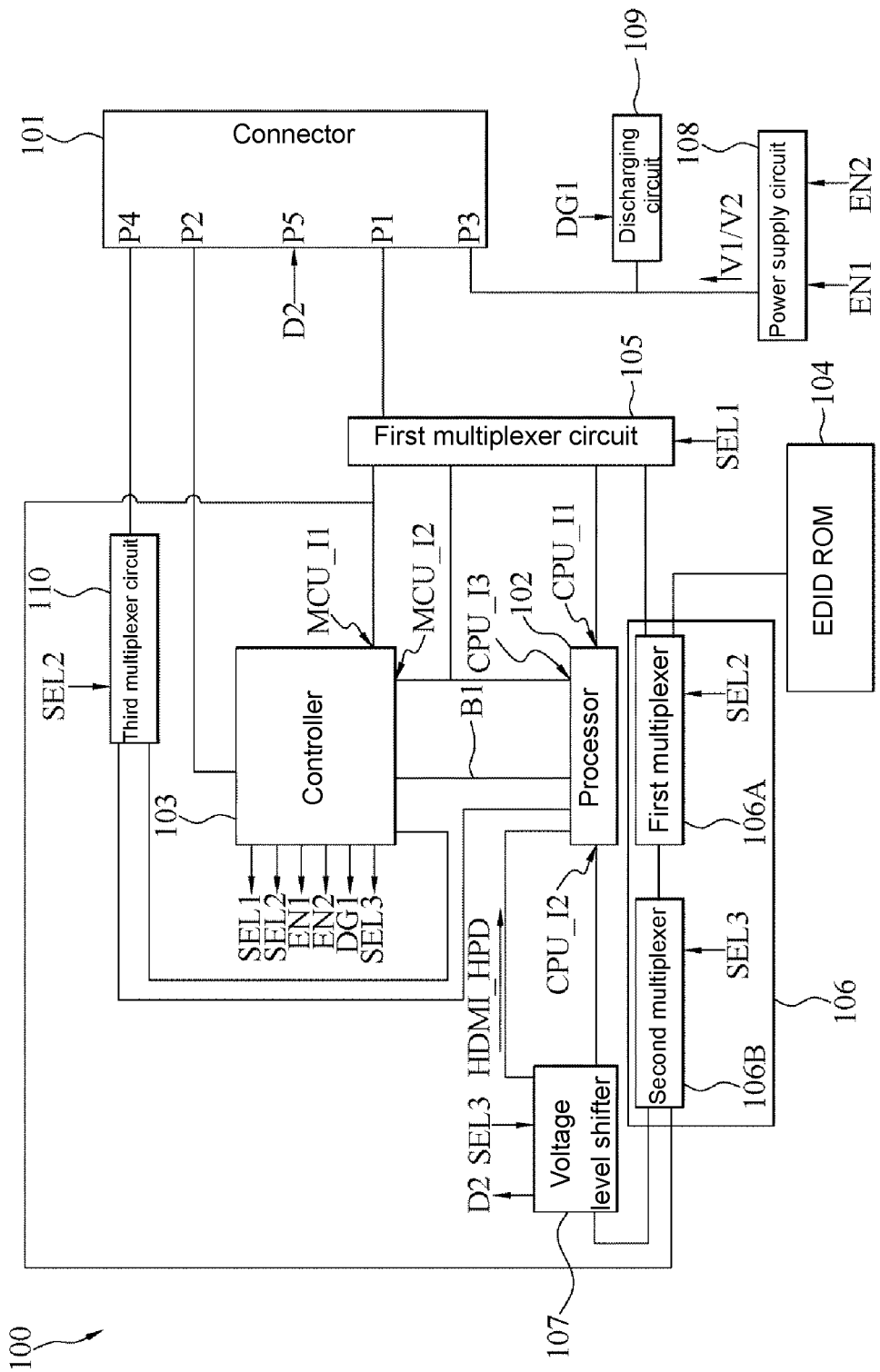
FIG. 2 is a block schematic diagram of an electronic device according to an embodiment.

FIG. 2 show a block schematic diagram of an electronic device according to an embodiment. Referring to FIG. 2, in some embodiments, the second multiplexer circuit 106 may include at least two multiplexers (hereinafter referred to as a first multiplexer 106A and a second multiplexer 106B). The first multiplexer 106A is coupled to the first multiplexer circuit 105, the EDID ROM 104 and the controller 103, and the second multiplexer 106B is coupled to the first multiplexer 106A, the second interface CPU_I2 of the processor 102 and the first interface MCU_I1 of the controller 103. The first multiplexer 106A can selectively electrically connect the second multiplexer 106B to the EDID ROM 104 or the first multiplexer circuit 105 according to a selection signal SEL2 from the controller 103, and the second multiplexer 106B can selectively electrically connect the second interface CPU_I2 of the processor 102 or the first interface MCU_I1 of the controller 103 to the first multiplexer 106A according to a selection signal SEL3 from the controller 103.

In a default state of the electronic device 100, the controller 103 may normally generate the selection signal SEL1 having a first set value to the first multiplexer circuit 105, so as to control the first multiplexer circuit 105 to normally electrically connect the signal pin P1 to the first interface MCU_I1 of the controller 103. In addition, the controller 103 may normally generate the selection signal SEL2 having a first selection value to the first multiplexer 106A of the second multiplexer circuit 106 so as to control the first multiplexer 106A to normally electrically connect the second multiplexer 106B to the EDID ROM 104, and may normally generate the selection signal SEL3 having a second selection value to the second multiplexer 106B of the second multiplexer circuit 106 so as to control the second multiplexer 106B to normally electrically connect the processor 102 to the first multiplexer 106A, further enabling the second interface CPU_I2 of the processor 102 to be normally electrically connected to the EDID ROM 104 sequentially through the second multiplexer 106B and the first multiplexer 106A.

In some implementation forms, the first selection value may be logic "0", and the second selection value may be logic "1"; however, the present invention is not limited to the above, and the first selection value and the second selection value may be designed according to application requirements.

In some embodiments, the electronic device 100 may further include a voltage level shifter 107 which is coupled between the second interface CPU_I2 of the processor 102 and the second multiplexer 106B of the second multiplexer circuit 106. In other words, the second multiplexer 106B of the second multiplexer circuit 106 may be coupled to the second interface CPU_I2 of the processor 102 through the voltage level shifter 107.

In some embodiments, the voltage level shifter 107 can be used for shifting a voltage level. For example, when the connection path between the second interface CPU_I2 of the processor 102 electrically connected to the signal pin P1 through the voltage level shifter 107 and the second multiplexer 106 is used as a display data channel, in a way that the external device 300 can transmit EDID to the processor 102 through the connection path, the voltage level shifter 107 may perform voltage level shifting (for example, shifting from 5 V to 3 V) on the EDID received, and then transmit the EDID that has undergone the voltage level shifting to the processor 102.

In some embodiments, the connector 101 may further include a video pin P5, and the voltage level shifter 107 may be further coupled to the video pin P5 and the controller 103. Herein, the voltage level shifter 107 serves as a repeater. The voltage level shifter 107 may receive a selection signal SEL3 from the controller 103, and selectively generate a notification signal HDMI_HPD to the processor 102 according to the selection signal SEL3. When the selection signal SEL3 has a first selection value, the voltage level shifter 107 does not output the notification signal HDMI_HPD; when the selection signal SEL3 has a second selection value, the voltage level shifter 107 outputs the notification signal HDMI_HPD to the processor 102. Upon receiving the notification signal HDMI_HPD, the processor 102 outputs video data D2 to the voltage level shifter 107, and the voltage level shifter 107 enhances the video data D2 and outputs the enhanced video data D2 through the video pin P5 of the connector 101 to the external device 300, for the external device 300 to display corresponding video and audio. However, the present invention is not limited to the examples above. In some other embodiments, the processor 102 may also directly output the video data D2 to the video pin P5 of the connector 101 according to an instruction of the controller 103.

In some implementation forms, the electronic device 100 may be a digital video recorder or a computer, and the external device 300 may be various types of screens, for example, a touch screen or a display screen. The connector 101 may be a standard High-Definition Multimedia Interface (HDMI) Type A connection port, the signal pin P1 may be pin #15 and pin #16 for Display Data Channel (DDC) in a standard HDMI connection port, and the video pin P5 may be pin #1 to pin #12 for transmitting time-minimized differential signal (TMDS) in a standard HDMI connection port. The processor 102 may be implemented by a system on chip (SoC), a central processing unit (CPU), a microprocessor, an application processor (AP), a digital signal processor (DSP), an application-specific integrated circuit (ASIC), or a combination thereof. However, the present invention is not limited to the above, and the processor 102 may be a core circuit suitable for executing various computations and operations in a system of the electronic device 100. The controller 103 may be implemented by a micro controller unit (MCU), a keyboard controller (KBC) or an embedded controller (EC). However, the present invention is not limited thereto, and the controller 103 may be any control circuit suitable for performing a specific task. Moreover, the voltage level shifter 107 may be implemented by an integrated chip, so as to have both the voltage level shifting and signal enhancement functions.

In some implementation forms, the first interface MCU_I1 of the controller 103 may be a transmission interface using the Inter-Integrated Circuit (I2C) connection standard, and the second interface MCU_I2 of the controller 103 may be a transmission interface using the Universal Asynchronous Receiver/Transmitter (UART) connection standard. Moreover, the first interface CPU_I1 of the processor 102 may be a transmission interface using the Universal Serial Bus (USB) 2.0 connection standard. It should be noted that, the present invention is not limited to the examples above.

The EDID ROM 104 is for storing EDID. In some embodiments, when the external device 300 connected to the electronic device 100 does not include EDID, the processor 102 of the electronic device 100 can read the EDID ROM 104, so as to generate according to the EDID the video data D2 having a corresponding display specification for the external device 300 to display.

In some embodiments, the electronic device 100 may perform the update method of any embodiment, so as to update the EDID in the EDID ROM 104. In some embodiments, the update may be replacing EDID in an older version stored in the EDID ROM 104 with EDID in a newer version. In another embodiment, the update may be replacing EDID that does not meet the specification of the external device 300 with EDID that meets the specification of the external device 300.

Figure 3:
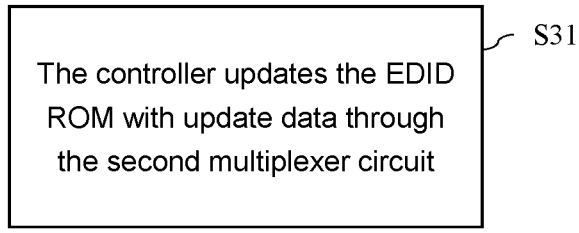
FIG. 3 is a flowchart of an update method according to an embodiment.

FIG. 3 shows a flowchart of an update method according to an embodiment. Referring to FIG. 1 to FIG. 3, in some embodiments, in an update state, the electronic device 100 updates the EDID in the EDID ROM 104 with update data D1 by the controller 103 through the second multiplexer circuit 106 (step S31). The update data D1 may be EDID in a newer version or EDID that meets the specification of the external device 300.

Figure 4:
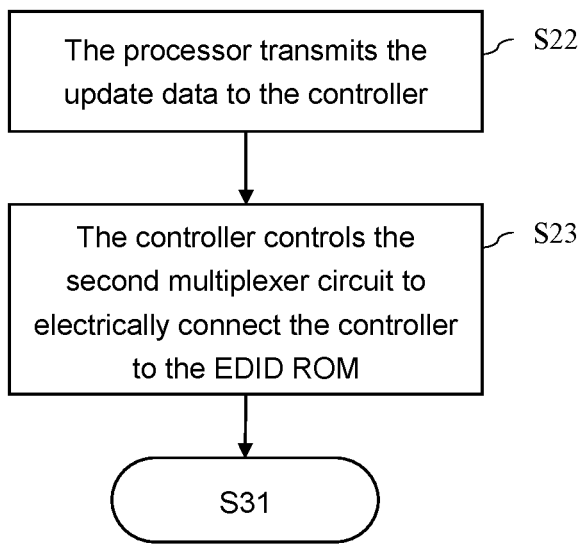
FIG. 4 is a flowchart of an update method according to a first implementation form.

FIG. 4 shows a flowchart of an update method according to a first implementation form. Referring to FIG. 1 to FIG. 4, in some embodiments, the electronic device 100 obtains the update data D1 by the processor 102, and the processor 102 may transmit the update data D1 to the controller 103 through a bus B1 (step S22), for the controller 103 to update the EDID ROM 104. After the controller 103 receives the update data D1 from the processor 102, the controller 103 may control the second multiplexer circuit 106 to electrically connect the first interface MCU_I1 of the controller 103 to the EDID ROM 104 (step S23), and then perform step S31 so that the controller 103 updates the EDID ROM 104 using the update data D1. Thus, in some embodiments, the electronic device 100 enters the update state once the controller 103 receives the update data D1 from the processor 102. Herein, the controller 103 in the update state controls the second multiplexer circuit 106 to electrically connect the controller 103 to the EDID ROM 104, and updates the EDID ROM 104 using the update data D1.

In step S22 according to an embodiment, the processor 102 may obtain the update data D1 in response to an update instruction received. The update instruction may be generated in response to a manual update request inputted through an input device by a user. In some embodiments, the update data D1 may be stored in a storage device, and the processor 102 may obtain the update data D1 by accessing the storage device according to the update instruction. In some implementation forms, the storage device may be a hard drive or a portable disk. Moreover, the bus B1 may be I2C; however, the present invention is not limited thereto.

In step S23 according to an embodiment, the controller 103 may generate the selection signal SEL2 having the first selection value and the selection signal SEL3 having the first selection value to the second multiplexer circuit 106. The first multiplexer 106A of the second multiplexer circuit 106 electrically connects the EDID ROM 104 to the second multiplexer 106B of the second multiplexer circuit 106 according to the selection signal SEL2 having the first selection value, and the second multiplexer 106B electrically connects the controller 103 to the first multiplexer 106A according to the selection signal SEL3 having the first selection value, so that the controller 103 is electrically connected to the EDID ROM 104 sequentially through the second multiplexer 106B and the first multiplexer 106A.

In some embodiments, as shown in FIG. 1, the processor 101 further includes a detection pin P2. The controller 103 is coupled to the detection pin P2 of the connector 101. Herein, the controller 103 may monitor the detection pin P2, and may determine according to whether a hot-plug signal HPD occurs at the detection pin P2 whether the external device 300 is connected to the connector 101 through the transmission line 200. In some implementation forms, the detection pin P2 may be pin #19 for hot-plug detection in a standard HDMI connection port.

Figure 5:
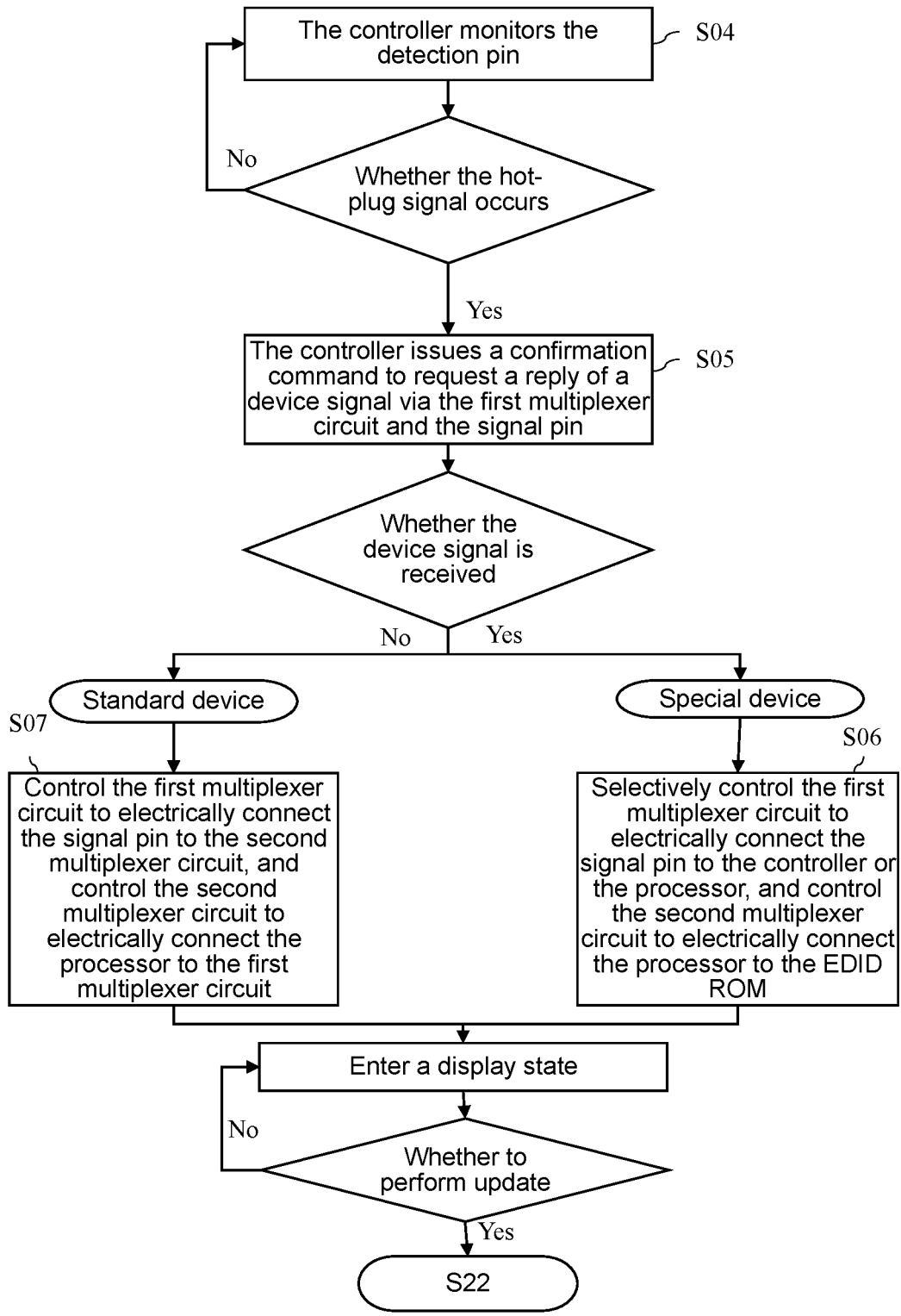
FIG. 5 is a flowchart of an update method according to a second implementation form.

FIG. 5 shows a flowchart of an update method according to a second implementation form. Referring to FIG. 1 to FIG. 5 and FIG. 7, in some embodiments, before step S22, the electronic device 100 may monitor the detection pin P2 by the controller 103 (step S04) to determine whether the external device 300 is connected to the connector 101. Once the controller 103 detects the hot-plug signal HPD occurring at the detection pin P2, it means that the external device 300 is connected to the connector 101 through the transmission line 200. At this point in time, the controller 103 may issue a confirmation command C1 via the first interface MCU_I1 thereof, and transmit the confirmation command C1 via the first multiplexer circuit 105 and the signal pin P1, so as to request the external device 300 to return a reply of a device signal DEV (step S05). As such, the controller 103 may determine that the external device 300 is a standard device or a special device according to whether the device signal DEV is received.

In some embodiments, a special device refers to an electronic device with a controller, and the controller of the special device generates the device signal DEV having corresponding content according to the connection standard used for transmission, and accordingly returns a reply to the electronic device 100. A standard device refers to an electronic device without a controller, and does not generate the device signal DEV in response to the confirmation command C1. In some implementation forms, the confirmation command C1 may be an addressing command of the I2C connection standard. Moreover, the special device may adopt the I2C connection standard, UART connection standard or USB 2.0 connection standard for transmission; however, the present invention is not limited to these examples.

In some embodiments, after performing step S05, if the controller 103 receives at the first interface MCU_I1 the device signal DEV transmitted from the external device 300 via the first multiplexer circuit 105 and the signal pin P1, it means that the external device 300 connected to the connector 101 is a special device. Conversely, after performing step S05, if the controller 103 does not receive at the first interface MCU_I1 the device signal DEV transmitted from the external device 300, it means that the external device 300 connected to the connector 101 is a standard device. In some embodiments, the controller 103 may wait for a predetermined period of time after step S05 is performed, and determine that the external device 300 is a standard device if the device signal DEV has not yet been received before the predetermined period of time expires. In some embodiments, the controller 103 may iterate step S05 and wait for a predetermined period of time, and determine that the external device 300 is a standard device when a predetermined number of times is exceeded. In some implementation forms, the predetermined number of times may be between 3 and 10; however, the present invention is not limited to these exemplary values, and the predetermined number of times may be any appropriate value.

In some embodiments, as shown in FIG. 5, step S04 and step S05 may be performed before step S22. In this embodiment, when the controller 103 determines that the external device 300 is a special device after step S05 is performed, the controller 103 learns according to the content of the device signal DEV the connection standard adopted by the external device 300, and accordingly selectively controls the first multiplexer circuit 105 to electrically connect the signal pin P1 of the connector 101 to the first interface MCU_I1 of the controller 103, the second interface MCU_I2 of the controller 103 or the first interface CPU_I1 of the processor 102, and controls the second multiplexer circuit 106 to electrically connect the processor 102 to the EDID ROM 104 (step S06). When the controller 103 determines that the external device 300 is a standard device after step S05 is performed, the controller 103 controls the first multiplexer circuit 105 to electrically connect the signal pin P1 of the connector 101 to the second multiplexer circuit 106, and controls the second multiplexer circuit 106 to electrically connect the processor 102 to the first multiplexer circuit 105, so that the signal pin P1 of the connector 101 may be electrically connected to the processor 102 sequentially through the first multiplexer circuit 105 and the second multiplexer circuit 106 (step S07).

Figure 6:
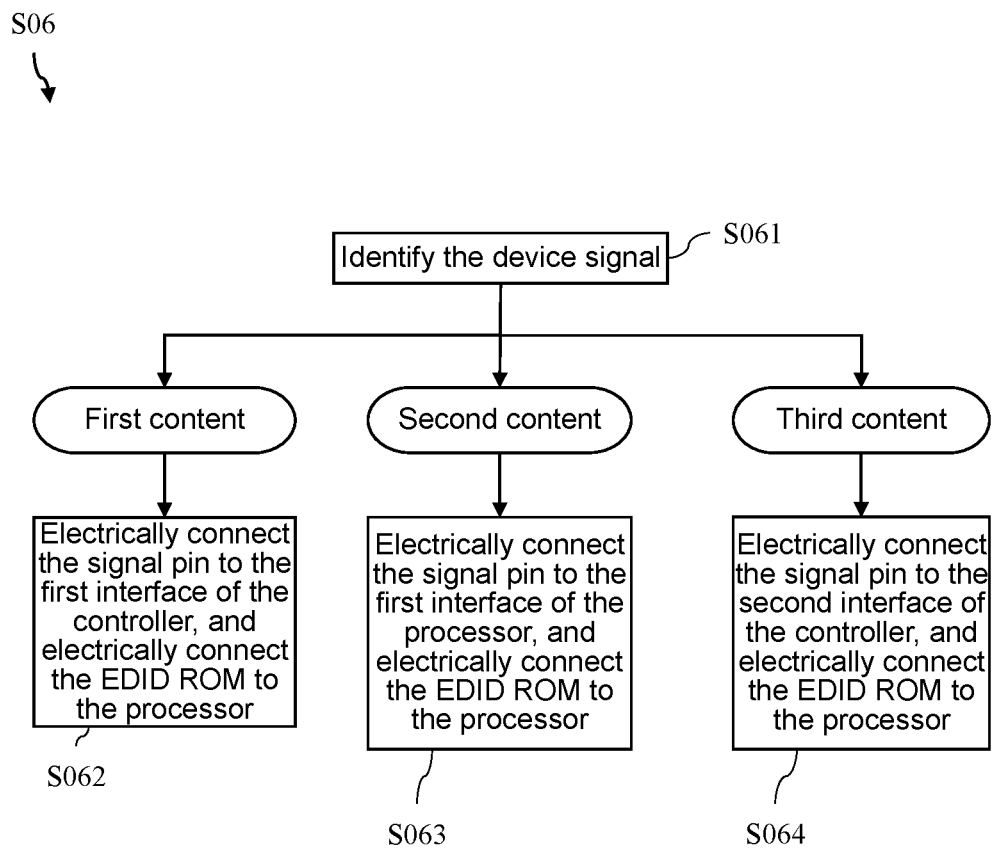
FIG. 6 is a flowchart of step S06 according to an embodiment.

FIG. 6 shows a flowchart of step S06 according to an embodiment. Referring to FIG. 1 to FIG. 6, in step S06 according to an embodiment, the controller 103 can perform identification on the device signal DEV (step S061). When the controller 103 identifies that the device signal DEV is first content, the controller 103 may keep generating the selection signal SEL1 having a first set value to the first multiplexer circuit 105, so as to control the first multiplexer circuit 105 to electrically connect the signal pin P1 to the first interface MCU_I1 of the controller 103, and generate the selection signal SEL2 having a first selection value to the first multiplexer 106A and generate the selection signal SEL3 having a second selection value to the second multiplexer 106B, so as to control the second multiplexer circuit 106 to electrically connect the EDID ROM 104 to the processor 102 (step S062). When the controller 103 identifies that the device signal DEV is second content, the controller 103 may generate the selection signal SEL1 having a second set value to the first multiplexer circuit 105, so as to control the first multiplexer circuit 105 to electrically connect the signal pin P1 to the first interface CPU_I1 of the processor 102, and generate the selection signal SEL2 having the first selection value to the first multiplexer 106A and generate the selection signal SEL3 having the second selection value to the second multiplexer 106B, so as to control the second multiplexer circuit 106 to electrically connect the EDID ROM 104 to the processor 102 (step S063). When the controller 103 identifies that the device signal DEV is third content, the controller 103 may generate the selection signal SEL1 having a third set value to the first multiplexer circuit 105, so as to control the first multiplexer circuit 105 to electrically connect the signal pin P1 to the second interface MCU_I2 of the controller 103, and generate the selection signal SEL2 having the first selection value to the first multiplexer 106A and generate the selection signal SEL3 having the second selection value to the second multiplexer 106B, so as to control the second multiplexer circuit 106 to electrically connect the EDID ROM 104 to the processor 102 (step S064).

In step S07 according to an embodiment, the controller 103 may generate the selection signal SEL1 having a fourth set value to the first multiplexer circuit 105, so as to control the first multiplexer circuit 105 to electrically connect the signal pin P1 to the second multiplexer circuit 106, and the controller 103 may generate the selection signal SEL2 having the second selection value and the selection signal SEL3 having the second selection value to the second multiplexer circuit 106, so as to control the second multiplexer circuit 106 to electrically connect the first multiplexer circuit 105 to the processor 102.

In some implementation forms, the first content of the device signal DEV may be the I2C connection standard, the second content of the device signal DEV may be the USB 2.0 connection standard, and the third content of the device signal DEV may be the UART connection standard; however, the present invention is not limited to the examples above. Moreover, the processor 102 may also include a transmission interface CPU_I3 adopting the UART connection standard. Thus, in step S064, the controller 103 may also control the first multiplexer circuit 105 to electrically connect the signal pin P1 of the connector 101 to the transmission interface CPU_I3 adopting the UART connection standard in the processor 102.

In some implementation forms, the second interface MCU_I2 of the controller 103 and the transmission interface CPU_I3 of the processor 102 may coexist. In some other embodiments, only one of the second interface MCU_I2 of the controller 103 and the transmission interface CPU_I3 of the processor 102 may exist.

Figure 7:
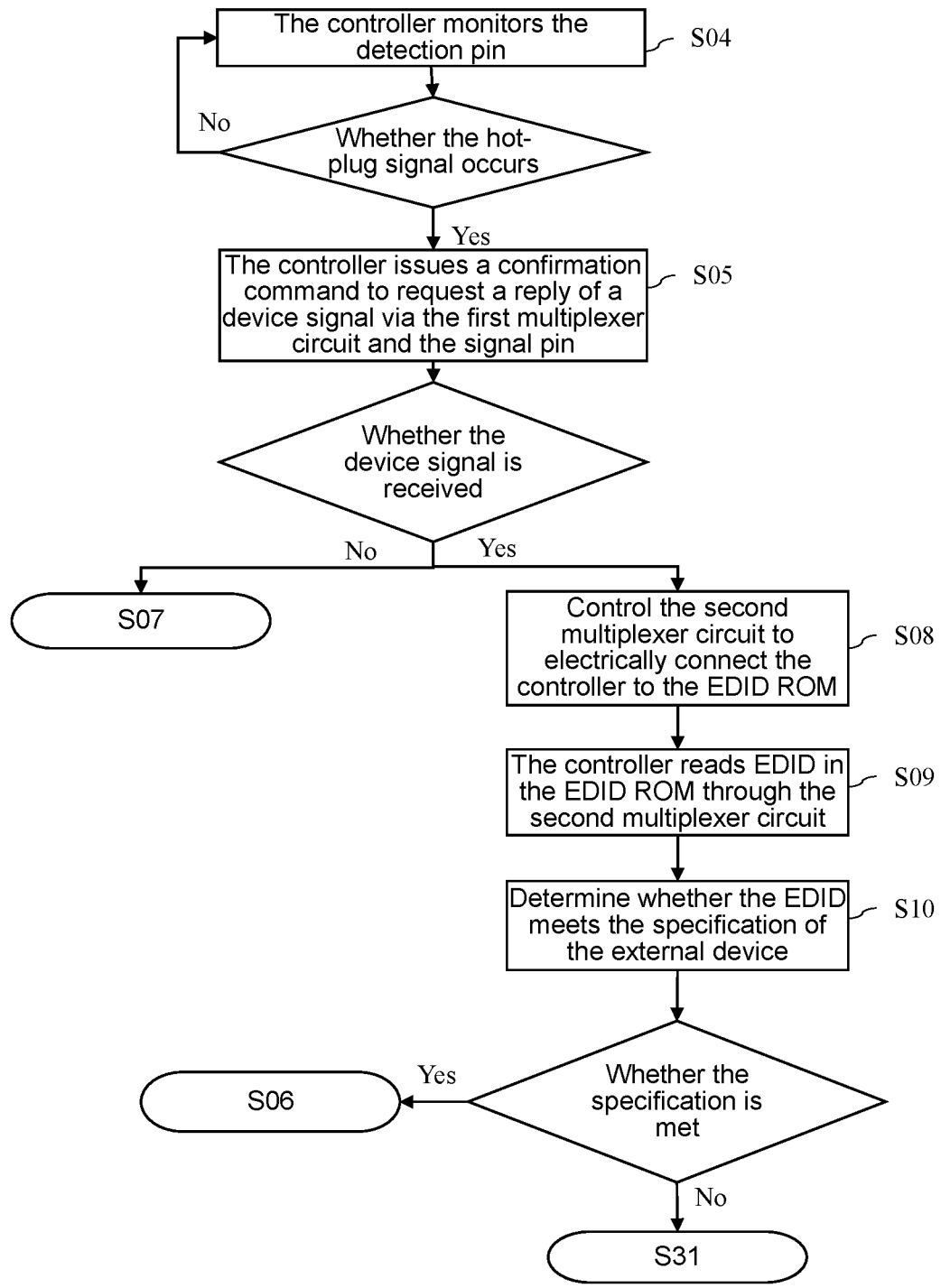
FIG. 7 is a flowchart of an update method according to a third implementation form.

FIG. 7 shows a flowchart of an update method according to a third implementation form. Referring to FIG. 1 and FIG. 7, in some embodiments, the electronic device 100 may first sequentially perform step S04 and step S05 above. Herein, when the controller 103 determines that the external device 300 is a special device after step S05 is performed, the controller 103 may first control the second multiplexer circuit 106 to electrically connect the controller 103 to the EDID ROM 104 (step S08), so that the controller 103 can read the EDID in the EDID ROM 104 via the second multiplexer circuit 106 (step S09). In step S08 according to an embodiment, the controller 103 may generate the selection signal SEL2 having the first selection value and the selection signal SEL3 having the first selection value to the second multiplexer 106B and the first multiplexer 106A of the second multiplexer circuit 106, respectively, so that the controller 103 may be electrically connected to the EDID ROM 104 sequentially through the second multiplexer 106B and the first multiplexer 106A.

In continuation to step S09, the controller 103 may determine according to the EDID and the device signal DEV whether the EDID meets the specification of the external device 300 (step S10). In step S10 according to an embodiment, the controller 103 may determine according to whether identity (ID) information carried in the EDID and ID information carried in the device signal DEV match whether the EDID is applicable to the external device 300; however, the present invention is not limited to the examples above. In step S10 according to another embodiment, the controller 103 may further determine according to version information in the EDID and the device signal DEV whether the EDID is applicable to the external device 300.

When the controller 103 determines in step S10 that the EDID does not meet the specification of the external device 300, it means that the EDID is not applicable to the external device 300 and update should be performed. At this point in time, the controller 103 performs step S31 so as to update the EDID ROM 104 using the update data D1. Thus, in some embodiments, the electronic device 100 may enter the update state when the controller 103 determines that the EDID does not meet the specification of the external device 300. Herein, the controller 103 in the update state may directly update the EDID ROM 104 using the update data D1 through the second multiplexer circuit 106.

Figure 8:
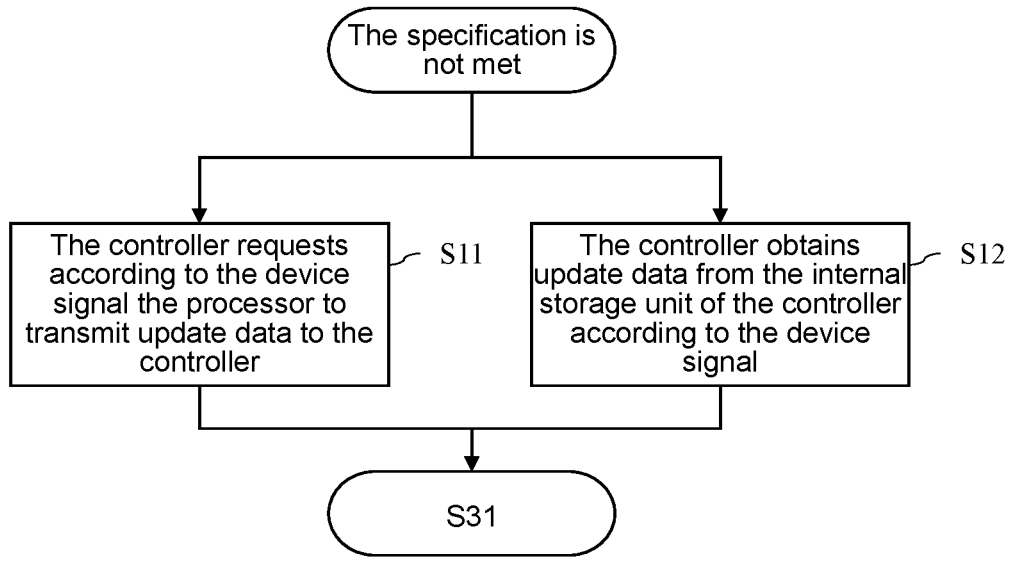
FIG. 8 is a flowchart of a process performed after it is determined that a specification is not met in step S10 according to an embodiment.

FIG. 8 shows a flowchart of a process performed after it is determined that a specification is not met in step S10 according to an embodiment. Referring to FIG. 1 to FIG. 8, in some embodiments, after it is determined that the EDID does not meet the specification of the external device 300, the controller 103 may request according to the device signal DEV the processor 102 to transmit corresponding update data D1 to the controller 103 (step S11). Moreover, the controller 103 continues to perform step S31 only after the update data D1 from the processor 102 is obtained. However, the present invention is not limited to the examples above. In some other embodiments, after it is determined that the EDID does not meet the specification of the external device 300, the controller 103 may also obtain the corresponding update data D1 from an internal storage unit thereof according to the device signal DEV (step S12), and continue to perform step S31 after obtaining the update data D1 from the internal storage unit thereof. In step S12 according to an embodiment, the controller 103 may obtain the update data D1 carrying matching ID information from the internal storage unit thereof according to the ID information in the device signal DEV. In some implementation forms, the internal storage unit may be, for example but not limited to, a cache of the controller 103.

In some embodiments, as shown in FIG. 7, when the controller 103 determines in step S10 that the EDID meets the specification of the external device 300, it means that no update is needed. At this point in time, the controller 103 may perform step S06 so as to control according to the content of the device signal DEV the first multiplexer circuit 105 and the second multiplexer circuit 106 to switch to corresponding connection paths.

In some embodiments, when the controller 103 determines that the external device 300 is a standard device after step S05 is performed, the controller 103 may perform step S07 and subsequent steps (as shown in FIG. 5 and FIG. 4).

Figure 9:
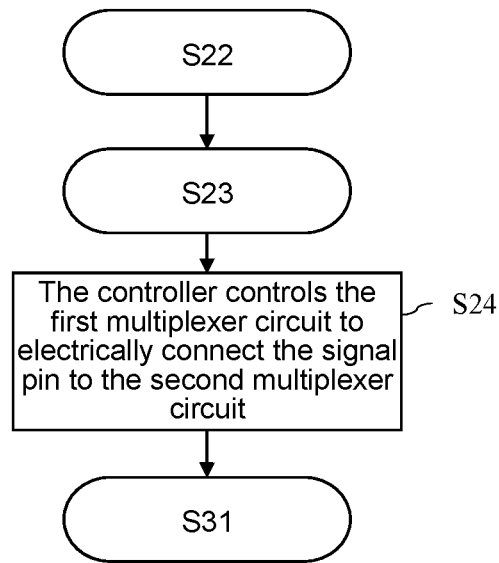
FIG. 9 is a flowchart after step S22 according to an embodiment.
Figure 10:
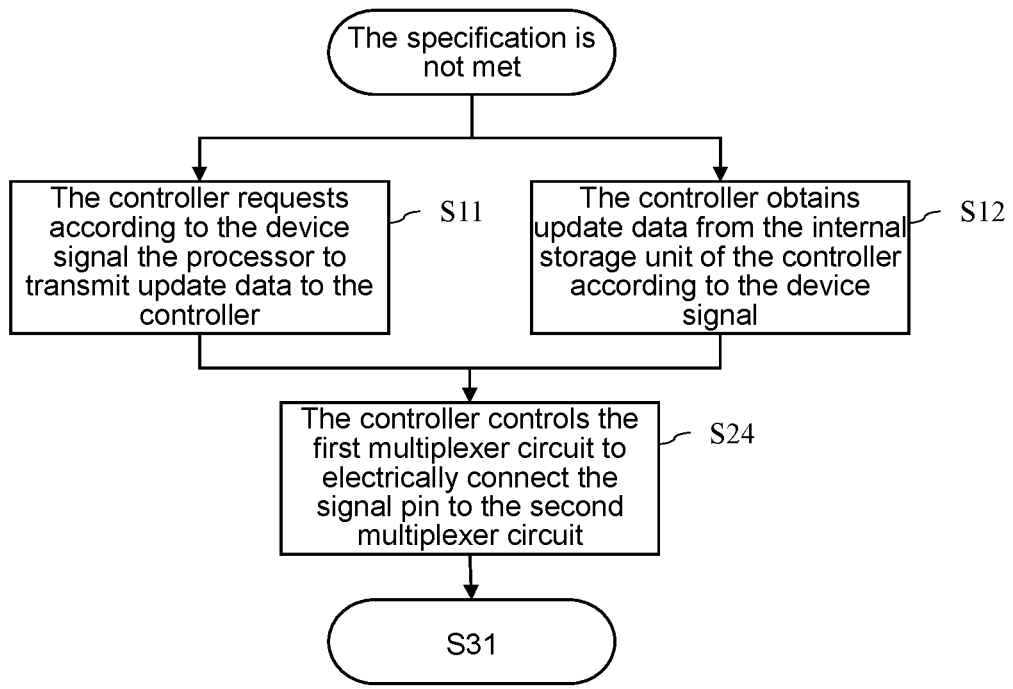
FIG. 10 is a flowchart of a process performed after it is determined that a specification is not met in step S10 according to an embodiment.

FIG. 9 shows a flowchart after step S22 according to an embodiment, and FIG. 10 shows a flowchart of a process performed after it is determined that a specification is not met in step S10 according to an embodiment. Referring to FIG. 1 to FIG. 10, in some embodiments, before step S31 is performed, the controller 103 may generate the selection signal SEL1 having the fourth set value to the first multiplexer circuit 105, so that the first multiplexer circuit 105 electrically connects the at least one signal pin P1 of the connector 101 to the second multiplexer circuit 106 (step S24). In some implementation forms, step S23 and step S24 in FIG. 9 may be performed in sequence, in reverse order, or simultaneously. Moreover, step S14 in FIG. 10 may be performed before step S12 or step S13, or be performed simultaneously with step S12 or step S13.

Figure 11:
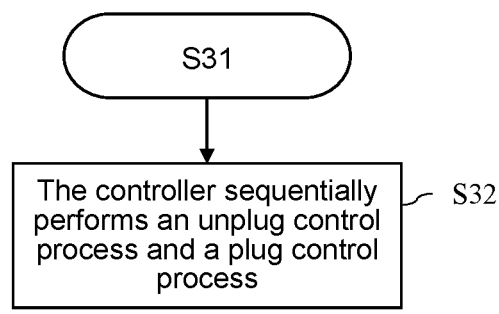
FIG. 11 is a flowchart of a process performed after step S31 according to an embodiment.

FIG. 11 shows a flowchart of a process performed after step S31 according to an embodiment. Referring to FIG. 1 to FIG. 11, in some embodiments, after the controller 103 completes the update of the EDID ROM 104 using the update data D1, the controller 103 sequentially performs an unplug control process and a plug control process (step S32). In some implementation forms, the controller 103 performs step S32 subsequent to step S31 only when it is determined that the external device 300 is a special device.

In step S32 according to some embodiments, in the unplug control process, the controller 103 may control the first multiplexer circuit 105 to electrically connect the signal pin P1 to the first interface MCU_I1 of the controller 103, and control the second multiplexer circuit 106 to electrically connect the processor 102 to the EDID ROM 104, so as to restore to the default state of the electronic state 100.

In some embodiments, as shown in FIG. 2, the electronic device 100 further includes a power supply circuit 108, the connector 101 further includes a power pin P3, and the power supply circuit 108 is coupled to the power pin P3 and the controller 103. The power supply circuit 108 can provide a first voltage V1 or a second voltage V2 to the power pin P3 according to the control of the controller 103.

In some embodiments, when the controller 103 outputs a first enable signal EN1 to the power supply circuit 108, the power supply circuit 108 may output the first voltage V1 to the power pin P3. When the controller 103 outputs a second enable signal EN2 to the power supply circuit 108, the power supply circuit 108 outputs the second voltage V2 to the power pin P3. Wherein, the second voltage V2 is higher than the first voltage V1.

In some implementation forms, the power pin P3 of the connector 101 may be pin #18 for supplying power in a standard HDMI connection port. The first voltage V1 may be, for example but not limited to, 5 V, the second voltage V2 may be, for example but not limited to, 12 V, 14 V, 18 V, 24 V or 48 V, and the values of the first voltage V1 and the second voltage V2 may be designed according to requirements of the external device 300.

In some embodiments, in the default state of the electronic device 100, the controller 103 may normally output the first enable signal EN1 to the power supply circuit 108, so that the power supply circuit 108 normally provides the first voltage V1 to the power pin P3 according to the first enable signal EN1.

Figure 12:
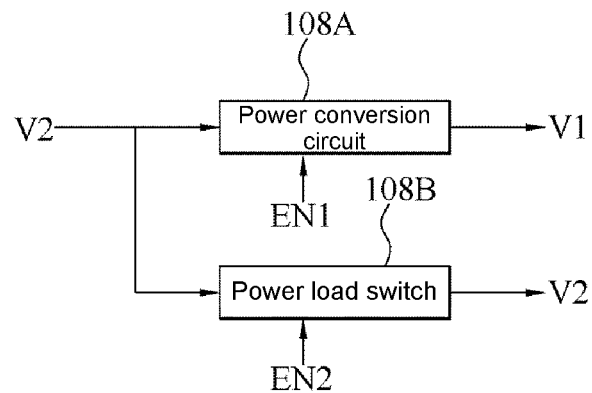
FIG. 12 is a block schematic diagram of a power supply circuit according to an embodiment.

FIG. 12 shows a block schematic diagram of a power supply circuit according to an embodiment. Referring to FIG. 1 to FIG. 12, in some embodiments, the power supply circuit 108 may include a power conversion circuit 108A and a power load switch 108B. The power conversion circuit 108A is coupled to the controller 103 and the power pin P3, and the power load switch 108B is coupled to the controller 103 and the power pin P3. The power conversion circuit 108A is for converting the second voltage V2 to the first voltage V1, and outputting the first voltage V1 obtained from the conversion to the power pin P3 upon receiving the first enable signal EN1 generated by the controller 103. The power load switch 108B is for receiving the second voltage V2, and outputting the second voltage V2 to the power pin P3 upon receiving the second enable signal EN2 generated by the controller 103.

In some implementation forms, the power conversion circuit 108A may be implemented by, for example but not limited to, a low dropout linear regulator (LDO). In addition, the power load switch 108B may be implemented by, for example but not limited to, a metal-oxide-semiconductor field-effect transistor (MOSFET), a bipolar junction transistor (BJT), a GaN FET or an insulated gate bipolar transistor (IGBT).

Figure 13:
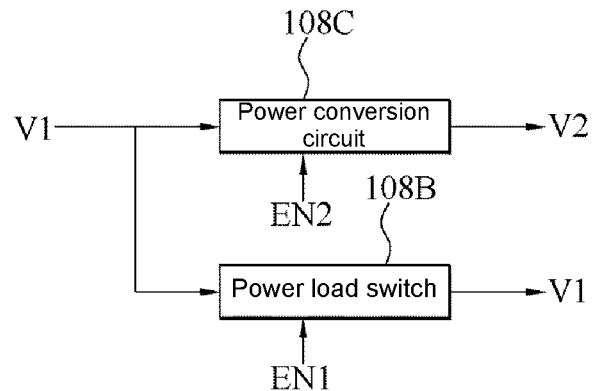
FIG. 13 is a block schematic diagram of a power supply circuit according to an embodiment.

FIG. 13 shows a block schematic diagram of a power supply circuit according to an embodiment. Referring to FIG. 1 to FIG. 13, in some other embodiments, the power supply circuit 108 may include a power conversion circuit 108C and the power load switch 108B. The power conversion circuit 108C is coupled to the controller 103 and the power pin P3, and the power load switch 108B is coupled to the controller 103 and the power pin P3. The power conversion circuit 108C is for converting the first voltage V1 to the second voltage V2, and outputting the second voltage V2 obtained from the conversion to the power pin P3 upon receiving the second enable signal EN2 generated by the controller 103. The power load switch 108B is for receiving the first voltage V1, and outputting the first voltage V1 to the power pin P3 upon receiving the first enable signal EN1 generated by the controller 103. In some implementation forms, the power conversion circuit 108C may be implemented by, for example but not limited to, a buck converter.

In some embodiments, the electronic device 100 may further include a discharging circuit 109 which is coupled to the power pin P3. The discharging circuit 109 may discharge the power pin P3 or stop discharging the power pin P3 according to a discharging signal DG1 of the controller 103. In some implementation forms, when the discharging signal DG1 is at a high potential, the discharging circuit 109 may discharge the power pin P3. When the discharging signal DG1 is at a low potential, the discharging circuit 109 does not discharge the power pin P3 or stop discharging the power pin P3. However, the present invention is not limited to the above, and the discharging circuit 109 may also be modified to discharge the power pin P3 when the discharging signal DG1 is at a low potential, and not discharge the power pin P3 or stop discharging the power pin P3 when the discharging signal DG1 is at a high potential.

In step S32 according to some embodiments, in the unplug control process, the controller 103 may not output the first enable signal EN1 or the second enable signal EN2, so that the power supply circuit 108 stops supplying power to the power pin P3, and the controller 103 may output the discharging signal DG1 so that the discharging circuit 109 discharges the power pin P3. After the discharging is performed for a predetermined period of time, the controller 103 stops outputting the discharging signal DG1 so that the discharging circuit 109 stops discharging the power pin P3, and outputs the first enable signal EN1 so as to control the power supply circuit 108 to restore supply of the first voltage V1 to the power pin P3. In some implementation forms, the predetermined period of time may be several hundreds of milliseconds; however, the present invention is not limited to the above.

In step S32 according to some embodiments, in the plug control process, the controller 103 may monitor the detection pin P2, and issue the confirmation command C1 through the first multiplexer circuit 105 and the signal pin P1 upon detecting the hog-plug signal HPD occurring at the detection pin P2, so as to request a reply of the device signal DEV. Upon receiving the device signal DEV, the controller 103 may selectively control the first multiplexer circuit 105 according to the content of the device signal DEV to electrically connect the signal pin P1 of the connector 101 to the first interface MCU_I1 of the controller 103, the second interface MCU_I2 of the controller 103 or the first interface CPU_I1 of the processor 102, and control the second multiplexer circuit 106 to electrically connect the processor 102 to the EDID ROM 104. When the device signal DEV is not received, the controller 103 may control the first multiplexer circuit 105 to electrically connect the signal pin P1 of the connector 101 to the second multiplexer circuit 106, and control the second multiplexer circuit 106 to electrically connect the processor 102 to the first multiplexer circuit 105, so that the signal pin P1 of the connector 101 may be electrically connected to the processor 102 sequentially through the first multiplexer circuit 105 and the second multiplexer circuit 106.

In some embodiments, when the external device 300 is a special device, after the controller 103 completes the update of the EDID ROM 104, the first multiplexer circuit 105 and the second multiplexer circuit 106 may be switched to correct connection paths by sequentially performing the unplug control process control process and the plug control process (since the controller 103 can perform corresponding control in the plug control process according to the device signal DEV). In addition, the controller 103 may prompt the processor 102 to output the video data D2 to the video pin P5 through the selection signal SEL3 having the second selection value, so that the electronic device 100 enters a display state. When the external device 300 is a standard device, after the controller 103 completes the update of the EDID ROM 104, the selection signal SEL3 may be switched from the first selection value to the second selection value and the selection signal SEL2 may be switched from the first selection value to the second selection value, so that the second multiplexer circuit 106 electrically connects the processor 102 to the first multiplexer circuit 105 (at this point in time, the first multiplexer circuit 105 electrically connects the signal pin P1 to the second multiplexer circuit 106), and prompts the processor 102 to output the video data D2 to the video pin P5, so that the electronic device 100 enters a display state.

In some embodiments, as shown in FIG. 2, the electronic device 100 further includes a third multiplexer circuit 110, the connector 101 further includes a control pin P4, and the third multiplexer circuit 110 is coupled to the control pin P4, the processor 102 and the controller 103. The third multiplexer circuit 110 is for selectively electrically connecting the control pin P4 of the connector 101 to the processor 102 or the controller 103 according to the selection signal SEL2. Herein, when the selection signal SEL2 has the first selection value, the third multiplexer circuit 110 electrically connects the control pin P4 to the controller 103. When the selection signal SEL2 has the second selection value, the third multiplexer circuit 110 electrically connects the control pin P4 to the processor 102.

In some embodiments, when the external device 300 is a special device, the external device 300 may output an activation signal to the control pin P4 of the connector 101. In some implementation forms, the activation signal may be generated by a power key. However, the present invention is not limited to the examples above, and in some other implementation forms, the activation signal may also be generated during system activation of the external device 300. In some other embodiments, when the external device 300 is a standard device, a standard Consumer Electronics Control (CEC) signal may be transmitted on the control pin P4 of the connector 101 between the electronic device 100 and the external device 300.

In some implementation forms, the control pin P4 of the connector 101 may be pin #13 for CEC in a standard HDMI connection port.

In conclusion, in the electronic device 100 with the connector 101 supporting multiple connection standards and the update method thereof according to any embodiment of the present invention, a connection path is established between the controller 103 and the EDID ROM 104 by switching the second multiplexer circuit 106, so that the controller 103 in an update state is enabled to update using the update data D1 the EDID ROM 104 built-in the electronic device 100 with the connector 101 supporting multiple connection standards. Moreover, in the electronic device 100 with the connector 101 supporting multiple connection standards and the update method thereof according to the embodiments of the present invention, in addition to manually enable the processor 102 to send the update data D1 to the controller 103 for prompting the controller 103 to enter an update state, it can be further automatically determined according to the EDID whether the controller 103 enters the update state after the controller 103 receives the device signal DEV. In particular, after the controller 103 enters the update state in response to the determination result, the controller 103 can further obtain the corresponding update data D1 according to the device signal DEV and accordingly perform automatic update. In addition, in the electronic device 100 with the connector 101 supporting multiple connection standards and the update method thereof according to the embodiments of the present invention, the transmission path of the at least one signal pin P1 of the connector 101 is switched according to whether the device signal DEV is received, so that one single connector 101 is enabled to support multiple connection standards, further enabling the electronic device 100 to perform transmission with a standard device or a special device through the single connector 101, and to select one of the multiple connection standards for application.

The technical contents of the present invention are disclosed by way of the preferred embodiments above. However, these embodiments are not to be construed as limitations to the present invention. Slight modifications and variations made by a person skilled in the art without departing from the spirit and scope of the present invention are encompassed within the scope of the present invention. Therefore, the scope of protection of the present invention shall be defined by the appended claims.

What is claimed is:

1. An electronic device with a connector supporting multiple connection standards, comprising:
   the connector, comprising at least one signal pin;
   a processor;
   a controller, coupled to the processor;
   an Extended Display Identification Data (EDID) read-only memory (ROM), for storing EDID;
   a first multiplexer circuit, coupled to the at least one signal pin, the processor and the controller; and
   a second multiplexer circuit, coupled to the EDID ROM, the first multiplexer circuit, the processor and the controller;
   wherein in an update state, the controller is electrically connected to the EDID ROM through the second multiplexer circuit, and updates EDID ROM with respect to EDID therein using update data through the second multiplexer circuit.

2. The electronic device with a connector supporting multiple connection standards of claim 1,
   wherein the controller further receives a device signal transmitted by an external device through the first multiplexer circuit and the at least one signal pin;
   wherein when the controller receives the device signal, the controller controls the second multiplexer circuit to electrically connect the controller to the EDID ROM, so that the controller reads the EDID of the EDID ROM through the second multiplexer circuit and determines according to the EDID and the device signal whether the EDID meets a specification of the external device; and
   wherein when the EDID does not meet the specification of the external device, the controller updates the EDID ROM using the update data through the second multiplexer circuit.

3. The electronic device with a connector supporting multiple connection standards of claim 2, wherein the controller requests according to the device signal the processor to transmit the update data to the controller, or the controller obtains the update data from an internal storage unit of the controller according to the device signal.

4. The electronic device with a connector supporting multiple connection standards of claim 2, wherein the connector further comprises a detection pin, the controller monitors the detection pin, and issues, upon detecting a hot-plug signal occurring at the detection pin, a confirmation command via the first multiplexer circuit and the at least one signal pin to request the external device to return a reply of the device signal.

5. The electronic device with a connector supporting multiple connection standards of claim 4, wherein when the controller issues the confirmation command and the device signal is not received, upon the controller receiving the update data from the processor, the controller controls the second multiplexer circuit to electrically connect the controller to the EDID ROM, so that the controller updates the EDID ROM using the update data through the second multiplexer circuit.

6. The electronic device with a connector supporting multiple connection standards of claim 1, wherein when the controller receives the update data from the processor, the controller controls the second multiplexer circuit to electrically connect the controller to the EDID ROM, so that the controller updates the EDID ROM using the update data through the second multiplexer circuit.

7. The electronic device with a connector supporting multiple connection standards of claim 1, wherein the controller further controls the first multiplexer circuit to electrically connect the at least one signal pin to the second multiplexer circuit.

8. The electronic device with a connector supporting multiple connection standards of claim 1, wherein the second multiplexer circuit comprises:
a first multiplexer, coupled to the first multiplexer circuit and the EDID ROM; and
a second multiplexer circuit, coupled to the first multiplexer, the processor and the controller;
wherein in a display state, the second multiplexer electrically connects the processor to the first multiplexer, and the first multiplexer electrically connects the second multiplexer to the first multiplexer circuit or the EDID ROM, so that the processor is electrically connected to the first multiplexer circuit or the EDID ROM through the second multiplexer and the first multiplexer; and
wherein in the update state, the second multiplexer electrically connects the controller to the first multiplexer, and the first multiplexer electrically connects the second multiplexer to the EDID ROM, so that the controller is electrically connected to the EDID ROM through the second multiplexer and the first multiplexer.

9. The electronic device with a connector supporting multiple connection standards of claim 8, further comprising:
a voltage level shifter, wherein the second multiplexer is coupled to the processor through the voltage level shifter.

10. The electronic device with a connector supporting multiple connection standards of claim 1, further comprising:
a voltage level shifter, wherein the second multiplexer circuit is coupled to the processor through the voltage level shifter.

11. The electronic device with a connector supporting multiple connection standards of claim 1, wherein in a display state, the controller controls the first multiplexer circuit to electrically connect the at least one signal pin to the controller, the processor or the second multiplexer circuit, and controls the second multiplexer circuit to electrically connect the processor to the EDID ROM or the first multiplexer circuit.

12. The electronic device with a connector supporting multiple connection standards of claim 2, wherein after the controller completes the updating of the EDID ROM using the update data, the controller sequentially performs an unplug control process and a plug control process.

13. The electronic device with a connector supporting multiple connection standards of claim 12, wherein in the unplug control process, the controller controls the first multiplexer circuit to electrically connect the at least one signal pin to the controller, and controls the second multiplexer circuit to electrically connect the processor to the EDID ROM.

14. The electronic device with a connector supporting multiple connection standards of claim 12, wherein the connector further comprising a power pin, the electronic device further comprising:
a power supply circuit, coupled to the power pin, providing a first voltage to the power pin; and
a discharging circuit, coupled to the power pin;
wherein when the device signal is received, the controller controls the power supply circuit to switch to provide a second voltage higher than the first voltage to the power pin; and
wherein in the unplug control process, the controller controls the power supply circuit to stop supplying power and controls the discharging circuit to discharge the power pin, and after discharging for a predetermined period of time, the controller controls the discharging circuit to stop discharging and controls the power supply circuit to provide the first voltage to the power pin.

15. The electronic device with a connector supporting multiple connection standards of claim 12, wherein the connector further comprises a detection pin; in the plug control process, the controller monitors the detection pin, and issues, upon detecting a hot-plug signal occurring at the detection pin, a confirmation command via the first multiplexer circuit and the at least one signal pin to request a reply of the device signal, and upon receiving the device signal, the controller controls the first multiplexer circuit to electrically connect the at least one signal pin to the controller or the processor, and controls the second multiplexer circuit to electrically connect the processor to the EDID ROM.

16. An update method for an electronic device with a connector supporting multiple connection standards, the connector, comprising at least one signal pin, the electronic device comprising a processor, a controller, coupled to the processor, an Extended Display Identification Data (EDID) read-only memory (ROM), for storing EDID, a first multiplexer circuit, coupled to the at least one signal pin, the processor and the controller, and a second multiplexer circuit, coupled to the EDID ROM, the first multiplexer circuit, the processor and the controller, the update method comprising:

in an update state, updating the Extended Display Identification Data (EDID) read-only memory (ROM) using update data by the controller through the second multiplexer circuit.

17. The update method for an electronic device with a connector supporting multiple connection standards of claim 16, further comprising:
upon receiving a device signal transmitted by an external device through the first multiplexer circuit and at least one signal pin of the connector, electrically connecting the controller to the EDID ROM by the second multiplexer circuit;
reading EDID of the EDID ROM by the controller through the second multiplexer circuit;
determining according to the EDID and the device signal by the controller whether the EDID meets a specification of the external device; and
when it is determined that the EDID does not meet the specification of the external device, performing the step of updating the EDID ROM using the update data by the controller through the second multiplexer circuit.

18. The update method for an electronic device with a connector supporting multiple connection standards of claim 17, further comprising:
requesting the processor by the controller according to the device signal to transmit the update data to the controller.

19. The update method for an electronic device with a connector supporting multiple connection standards of claim 17, further comprising:
in the update state, obtaining the update data from an internal storage unit of the controller by the controller according to the device signal.

20. The update method for an electronic device with a connector supporting multiple connection standards of claim 17, further comprising:
monitoring a detection pin of the connector by the controller; and
upon detecting a hot-plug signal occurring at the detection pin, issuing a confirmation command by the controller via the first multiplexer circuit and the at least one signal pin to request the external device to return a reply of the device signal.

21. The update method for an electronic device with a connector supporting multiple connection standards of claim 20, further comprising:
after issuing the confirmation command by the controller and not receiving the device signal, upon the controller receiving the update data from the processor, controlling by the controller the second multiplexer circuit to electrically connect the controller to the EDID ROM, and performing the updating of the EDID ROM using the update data by the controller through the second multiplexer circuit.

22. The update method for an electronic device with a connector supporting multiple connection standards of claim 16, further comprising:
transmitting the update data to the controller by a processor; and
upon the controller receiving the update data, controlling by the controller the second multiplexer circuit to electrically connect the controller to the EDID ROM, and performing the updating of the EDID ROM using the update data by the controller through the second multiplexer circuit.

23. The update method for an electronic device with a connector supporting multiple connection standards of claim 16, further comprising:
electrically connecting the at least one signal pin of the connector to the second multiplexer circuit by a first multiplexer circuit.

24. The update method for an electronic device with a connector supporting multiple connection standards of claim 16, wherein in a display state, a first multiplexer of the second multiplexer circuit electrically connects the EDID ROM to a second multiplexer of the second multiplexer circuit, and the second multiplexer electrically connects the first multiplexer to a processor, and in the update state, the first multiplexer electrically connects the EDID ROM to the second multiplexer and the second multiplexer electrically connects the first multiplexer to the controller.

25. The update method for an electronic device with a connector supporting multiple connection standards of claim 24, wherein the second multiplexer is coupled to the processor through a voltage level shifter.

26. The update method for an electronic device with a connector supporting multiple connection standards of claim 16, further comprising:
in a display state, electrically connecting at least one signal pin of the connector to the controller, a processor or the second multiplexer circuit by a first multiplexer circuit; and
in the display state, electrically connecting the processor to the EDID ROM or the first multiplexer circuit by the second multiplexer circuit.

27. The update method for an electronic device with a connector supporting multiple connection standards of claim 17, further comprising:
after completing the updating of the EDID ROM using the update data, sequentially performing an unplug control process and a plug control process by the controller.

28. The update method for an electronic device with a connector supporting multiple connection standards of claim 27, wherein the unplug control process comprises:
electrically connecting the at least one signal pin to the controller by the first multiplexer circuit; and
electrically connecting a processor to the EDID ROM by the second multiplexer circuit.

29. The update method for an electronic device with a connector supporting multiple connection standards of claim 27, further comprising:
providing a first voltage to a power pin of the connector by a power supply circuit; and
upon receiving the device signal, switching to provide a second voltage higher than the first voltage to the power pin by the power supply circuit;
wherein the unplug control process comprises:
controlling the power supply circuit to stop supplying power;
controlling a discharging circuit to discharge the power pin; and
after discharging for a predetermined period of time, controlling the discharging circuit to stop discharging and controlling the power supply circuit to provide the first voltage to the power pin.

30. The update method for an electronic device with a connector supporting multiple connection standards of claim 27, wherein the plug control process comprises:
monitoring a detection pin of the connector by the controller;
upon detecting a hot-plug signal occurring at the detection pin, issuing a confirmation command by the controller via the first multiplexer circuit and the at least one signal pin to request a reply of the device signal; and upon receiving the device signal, controlling by the controller the first multiplexer circuit to electrically connect the at least one signal pin to the controller or a processor, and controlling the second multiplexer circuit to electrically connect the processor to the EDID ROM.

* * * * *